UNITED STATES PATENT OFFICE.

RENÉ JACQUES LÉVY, OF MANCHESTER, ENGLAND, AND ANDRÉ HELBRONNER, OF PARIS, FRANCE.

METHOD FOR THE SEPARATION OF GASES, &c.

959,563.   Specification of Letters Patent.   Patented May 31, 1910.

Application filed February 16, 1903. Serial No. 143,703.

*To all whom it may concern:*

Be it known that we, RENÉ JACQUES LÉVY, a French citizen, and resident of Manchester, in the county of Lancaster, England, and ANDRÉ HELBRONNER, a French citizen, and resident of Paris, in the Republic of France, have invented certain new and useful Improvements in Methods for the Separation of Gases, &c., of which the following is a specification.

This invention relates to improvements in the separation of gases from their mixtures, more especially the separation of oxygen and nitrogen from atmospheric air, for the purpose of obtaining free oxygen and free nitrogen.

The process will be described with reference to the separation of oxygen from nitrogen, but it is to be understood that the same process is applicable to other mixed gases.

It has been known since the year 1884, that air boils at —176° C., under a pressure of 4 atmospheres and that it boils at about —192° C. at atmospheric pressure (see Olzewski *Comptes Rendus de l'Academie des Sciences*, vol. 99, page 184). From this it follows that air can be liquefied at temperatures between about —176° C., and —192° C., at pressures varying from 15 up to 60 lbs. per square inch. We make use of this knowledge and these facts to first liquefy the air during our process of separating it into its constituent elements.

The invention will be fully described with reference to the accompanying drawings:—

Figure 1:
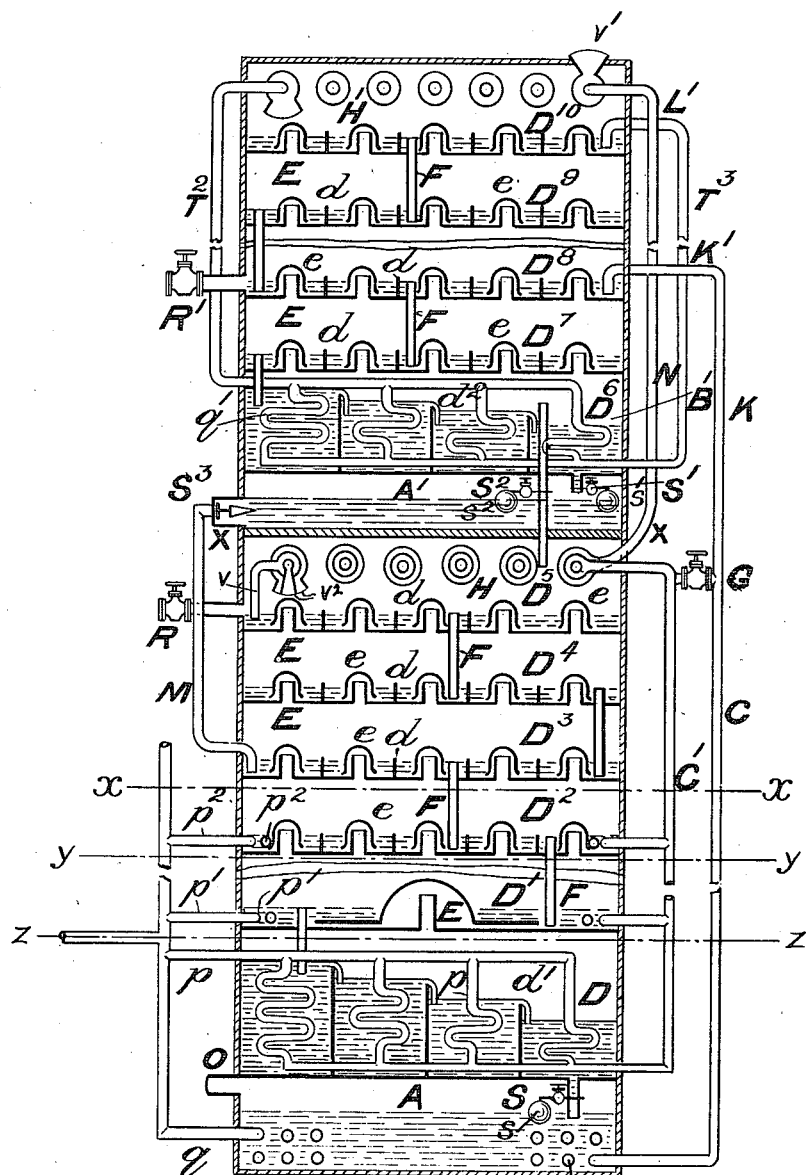
Figure 2:
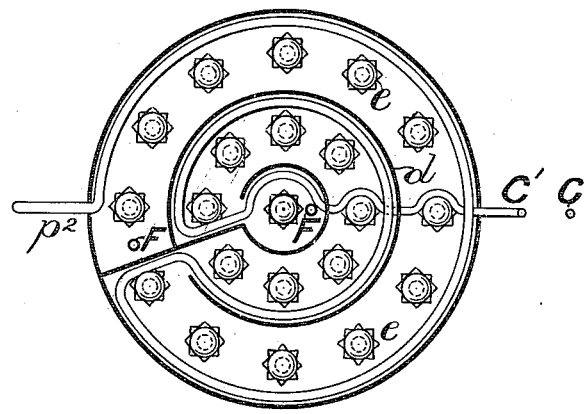
Figure 3:
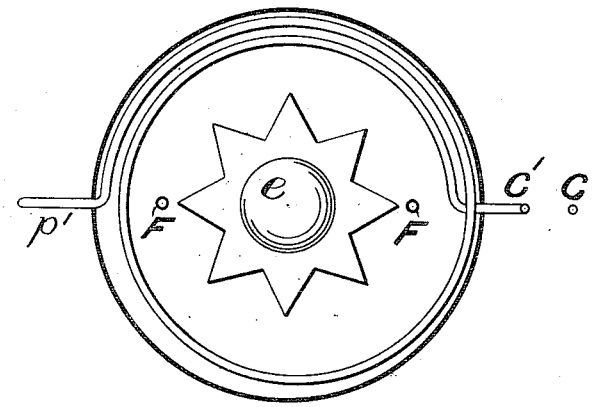
Figure 4:
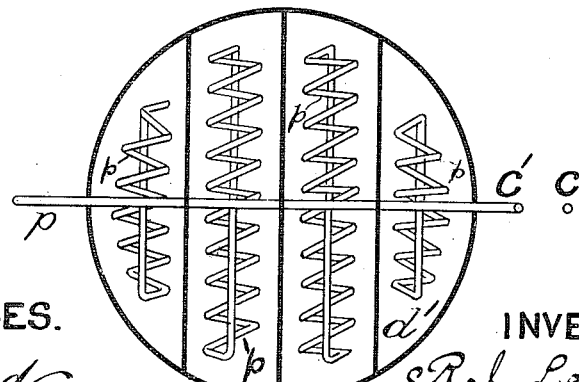

Figure 1, sectional elevation of apparatus in which the process is carried out. Fig. 2, sectional plan on line $x$—$x$ Fig. 1. Fig. 3, sectional plan on line $y$—$y$. Fig. 4, sectional plan on line $z$—$z$.

The apparatus is constructed in the form of a tower divided into two main compartments, by a division plate or partition X, and the compartments above and below the partition X, into any number of small chambers by the plates or trays D D′ D², etcetera. We have shown only a limited number of such chambers below the partition X, and above it; (the drawing is shown broken because of the limited space.) The plates or trays D, D′, D², etcetera, are provided with a passage or passages E through which the gas travels upward and also with a passage or passages F through which the liquid travels downward.

It is preferred to make one overflow or downward passage F in each tray for the liquid, and a number of the upward passages E for the gas. Each of the passages E is covered with a bell $e$, the edges of which dip into the liquid in the tray causing the gas flowing upward to flow through the liquid. The trays are preferably made with annular division plates $d$ to direct the flow of the liquid. The trays D in the lower of the main compartments and the tray D⁶ in the upper compartment are each preferably divided longitudinally into four sections $d'$, $d^2$, the liquid overflowing from one to the other. In the lower trays D, D′, and D², of the lower main compartment, are placed coils $p$, $p'$, $p^2$ through which the air to be separated passes into the apparatus. The outlet or overflow from the lower tray D is provided with a ball tap S actuated by a float $s$, to allow the liquid under pressure to flow from the deep tray D into the compartment A at the bottom. Similar means described hereafter permit of the flow of the liquid from the tray D⁶ into the compartment A′.

The working process is as follows:—The several trays are charged with liquid air. The cold dry air at the lowest necessary pressure is simultaneously introduced into the coils $q$ and $p$, $p'$, $p^2$, immersed in the liquid oxygen in the compartment A, and in the liquids rich in oxygen in the trays D, D′, D². A part of the liquid in these trays is vaporized in liquefying a corresponding quantity of the fresh air passing through the coils. The gas thus vaporized passes up through the pipes E into the trays above, and the liquid in the lower trays is enriched in oxygen by the vaporization as the nitrogen is the more volatile gas.

Instead of introducing the cold compressed air only in coils immersed in liquid oxygen it is distributed simultaneously through two, three or more of the lower trays in order to carry out the liquefaction in liquids as cold as possible, thereby reducing to a minimum the pressure and also the loss of liquefied air, owing to its vaporization when poured into the tray D⁵ under a lower pressure. The air liquefied in the coils is forced upward through the pipes C, C', by the excess of pressure of the air supply. A portion of the air liquefied in the lower compartment A, and collected in the pipe C is forced through the pipe K, into one of the trays $D^8$ of the upper main compartment, the remainder flowing through the valve G and coils H into the top tray $D^5$ of the lower main compartment. The liquid air from the pipe K is poured by the pipe K' into the tray $D^8$ in which the liquid has the composition of atmospheric air. The greater part of the liquefied air is led by the pipe C', into the exchanger H formed of three concentric coils, the liquid passing through the intermediate space from the right to the left and escaping at V, while the gas rich in nitrogen evolved from the tray $D^5$ entering at $V^2$ travels at the same time in the exterior and interior coils from the left to the right. In their travel upward the gases originally generated in the trays pass through the liquids of the several trays in succession.

The gases are split up by the notched edges of the bells, and thus an exchange of a part of the liquid nitrogen for a corresponding quantity of the oxygen of the gases is enabled to take place. The result of this series of exchanges is that the liquids flowing downward in the column become richer and richer in oxygen and the gases flowing upward richer and richer in nitrogen; the remaining nitrogen being vaporized in the divisions of the tray D, so that the liquid flowing by the ball tap into the bottom compartment A is pure oxygen. This liquid is vaporized in the compartment A and the gas flows out of the apparatus by the opening O to pass into the exchangers, (not shown in the drawing). On the other hand the gaseous mixtures rich in nitrogen flowing out at N under a pressure above atmospheric pressure, pass into the exchanger H', formed of two concentric coils from the right to the left of the interior coil and is cooled therein by the nitrogen resulting finally from the separation and which travels the exterior coil of the exchanger from the left to the right before its escape through the outlet v'. Then by means of the pipe $T^2$ this gas is led into the coils q' immersed in the liquid in the divisions of tray $D^6$, and a part of this liquid is vaporized in liquefying the gas sent into the coil.

The liquid formed in the coils q' is poured by the pipe $T^3$ at L' into the tray $D^{10}$ at the top of the apparatus. An exchange takes place between the gases generated in the compartment B' and flowing upward, and the liquid of the successive compartments. The result is that the gas after having finally passed through the upper compartment in which the liquid contains about 93% of nitrogen, will be formed of nitrogen of about 98% which flows out of the apparatus through v' (to be led into an exchanger not shown). At the same time nearly all the oxygen of the liquids accumulates in the compartments B', and the mixture flowing from B' into A' is richer in oxygen than air. The composition of this liquid mixture depends upon the number of trays above B', and upon the quantity of liquid air coming from the collecting pipe C, and poured by the pipes K, K' into the tray $D^8$. This liquid mixture flows into A' periodically and automatically for instance by means of a combination of a threeway stop tap S' and $S^2$. When the liquid reaches a high level the float s' shuts the cock S' of the outlet from the compartment B' to the compartment A', and so stops the flow of liquid into the compartment A'. Then the threeway cock $S^2$ actuated by the float $s^2$ allows the compartment A' to communicate with the lower part of the column, where there is a pressure greater than atmospheric pressure. Under the influence of this pressure the valve $S^3$ opens and the liquid flows through the pipe M into that tray of the lower division of the apparatus, in which the composition of the liquid is the same as the composition of the liquid flowing from A. In the drawing the pipe M is shown as let into the compartment $D^3$. When the level of the liquid is sufficiently lowered the float $s^2$ of the threeway cock $S^2$ puts into communication the interiors of the compartments A' and B', the pressure lowers to about the atmospheric pressure, the valve $S^3$ closes under the pressure from below and the float s' opens the corresponding cock S', and allows the liquid to flow again and so on.

To start the apparatus we admit liquid air by the cocks R, R', and when the trays of the apparatus up to the compartment $D^8$ are charged with liquid we close the cock R, and begin to work our apparatus by sending the air coming from the exchangers into the coils p p' $p^2$ and q, and the cock R' is only closed when the liquid rich in nitrogen poured in at L' has filled up the upper part of the column. To make up the losses of liquid caused by the imperfections of the insulation, and of the exchangers and other parts, we add through R' a small amount of liquid air made independently.

In the processes and apparatus hitherto employed for the separation of atmospheric air into its elements from liquid air, the separation has not been complete, a great part of the oxygen of the air treated being lost and the nitrogen being impure. By our process we obtain a complete separation of the air into its elements. We obtain 92% of the oxygen of the air treated in our apparatus in a state of complete purity, and nitrogen of a purity of 98%, or by repeating the process the gaseous mixture containing 98% of nitrogen being again liquefied, we obtain the whole of the oxygen of the air treated, and absolutely pure nitrogen.

Our invention consists essentially in effecting a first separation of the liquefied air under a pressure above atmospheric pressure, into liquid rich in oxygen and gaseous mixtures rich in nitrogen, subsequently reliquefying the gaseous mixtures rich in nitrogen and submitting them under a lower pressure to a new separation and finally vaporizing the oxygen, and drawing it off from the apparatus separately from the nitrogen. And more generally we can effect several successive rectifications each followed by a new liquefaction of the gaseous mixtures to be further fractionated the last separation only taking place under the lowest pressure, the others under increasing pressures from the last up to the first.

The second liquefaction is carried out under very advantageous conditions, as for instance, a slight increase of the initial pressure only is necessary, and as special dehydraters, exchangers, and similar devices are not employed for this reliquefaction there are no losses or inconvenience arising from the use of such devices.

The first separation is advantageously effected by conveniently adapted rectification combined with partial vaporization, viz., the liquid in the course of the rectification is submitted to successive vaporizing provoked by the liquefaction of cold compressed air, so that a part of the latter being liquefied in liquids cooler than pure oxygen it allows of the reduction of the pressure at which the liquefaction takes place, and moreover the loss of liquid, when poured under a lower pressure is thereby greatly reduced.

The air or mixture to be separated may be totally or partially liquefied in the first liquefaction. The partial liquefaction yielding a gaseous mixture richer in nitrogen than air, and a liquid mixture richer in oxygen. The gaseous mixture is liquefied along with the gas resulting from the first fractionation, which is also liquefied, and the liquid formed from both these gases is submitted to a rectification, and so on. The last liquefaction is always a complete one to increase the purity of the nitrogen, and recover more oxygen. The cooling of the air to liquefaction is effected in the exchanger H H' by the counter currents of the cold gaseous mixtures formed in the fractionating process.

The hereinbefore described process can be carried into effect by means of different forms of apparatus based on the same principles and the parts of the apparatus may be varied in their nature and disposition.

By the word "rectification" we wish to indicate the operation consisting of putting into a close contact (which has to be sufficiently long and extended) a gaseous current of oxygen and nitrogen (to be rectified) with a current of a liquid mixture of oxygen and nitrogen; the gaseous mixture of oxygen and nitrogen being richer in oxygen than the gas which would be emitted at the beginning of the vaporization of the liquid employed for the rectification. By these means a double and progressive exchange is permitted and caused to take place; the vapors yield up the oxygen they contain to the liquid and this causes the vaporization of an equivalent quantity of the nitrogen of the liquid.

We would have it clearly understood that our process and apparatus are applicable to the separation of the constituents of any other mixture of gases as well as for the separation of the constitutents of atmospheric air.

What we claim as our invention, and desire to protect by Letters Patent is:—

1. The process of separating oxygen and nitrogen from liquefied mixtures thereof which consists in vaporizing liquid rich in oxygen, rectifying the gas resulting from the said vaporization by causing it to pass upward through layers of liquids richer and richer in nitrogen the liquids progressively enriched in oxygen overflowing downward, reliquefying the gaseous mixture rich in nitrogen obtained by the first rectification by submitting it to a sufficient pressure and causing it to vaporize another portion of the reliquefied mixture and rectifying the gas resulting from the said vaporization by means of the reliquefied mixture.

2. The process of separating oxygen and nitrogen from liquefied mixtures of same comprising (a) liquefying dry cold compressed air by vaporizing liquids rich in oxygen, (b) submitting the gas resulting from the said vaporization to a rectification by means of the liquefied mixture, (c) reliquefying the gas rich in nitrogen resulting from the first rectification by causing it to vaporize liquid mixtures of oxygen and nitrogen, and (d) rectifying the gas resulting from the said vaporization by means of the reliquefied mixture.

3. In the separation of oxygen and nitrogen from liquefied mixtures of same, the use of a vaporized liquid rich in oxygen for cooling to liquefaction the dry cold mixture of the gases before submitting the liquefied gas to first separation, and subsequently reliquefying the gas rich in nitrogen resulting from the said separation and using such reliquefied mixture in completing the separation.

4. A process for obtaining pure nitrogen by means of liquefied mixtures of oxygen and nitrogen (air) which consists in vaporizing a liquid mixture of oxygen and nitrogen evolved from a reliquefaction of a similar gas by liquefying cold gaseous mixtures of oxygen and nitrogen and subjecting the gas resulting from the said vaporization to the rectifying action of liquid mixtures of oxygen and nitrogen less and less rich in oxygen and finally to the rectifying action of liquid mixtures richer in nitrogen than atmospheric liquefied air.

5. In the separation of oxygen and nitrogen by means of a liquefaction of the air and its rectification, in combination, a first rectification, the reliquefaction of the gas rich in nitrogen resulting from the said first rectification with a further rectification by means of the reliquefied mixture.

In witness whereof, we have hereunto signed our names, in the presence of two subscribing witnesses.

RENÉ JACQUES LÉVY.
ANDRÉ HELBRONNER.

Witnesses as to René Jacques Lévy:
   J. OWDEN O'BRIEN,
   H. BARNFATHER.

Witnesses as to André Helbronner:
   CAMEILLE CERT,
   W. HORR.